United States Patent
Harnetiaux

(10) Patent No.: US 9,920,858 B2
(45) Date of Patent: Mar. 20, 2018

(54) MOUNTING DEVICE FOR TUBULAR ELEMENTS

(71) Applicant: CNH Industrial America LLC, New Holland, PA (US)

(72) Inventor: Travis L. Harnetiaux, Bourbonnais, IL (US)

(73) Assignee: CNH Industrial America LLC, New Holland, PA (US)

( * ) Notice: Subject to any disclaimer, the term of this patent is extended or adjusted under 35 U.S.C. 154(b) by 85 days.

(21) Appl. No.: 14/755,415

(22) Filed: Jun. 30, 2015

(65) Prior Publication Data

US 2017/0002958 A1 Jan. 5, 2017

(51) Int. Cl.
| | |
|---|---|
| *F16L 3/08* | (2006.01) |
| *F16L 3/223* | (2006.01) |
| *F16L 3/06* | (2006.01) |
| *H02G 3/32* | (2006.01) |
| *B60R 16/02* | (2006.01) |

(52) U.S. Cl.
CPC .......... *F16L 3/223* (2013.01); *B60R 16/0215* (2013.01); *F16L 3/06* (2013.01); *H02G 3/32* (2013.01)

(58) Field of Classification Search
CPC ...................................................... H02G 3/32
See application file for complete search history.

(56) References Cited

U.S. PATENT DOCUMENTS

| | | | | |
|---|---|---|---|---|
| 3,155,355 | A | * 11/1964 | Cappola | F16L 3/1091 24/20 R |
| 3,632,071 | A | * 1/1972 | Cameron | F16L 3/08 24/16 PB |
| 3,913,187 | A | 10/1975 | Okuda | |
| D269,851 | S | * 7/1983 | Kimura | D8/356 |
| 5,035,383 | A | 7/1991 | Rainville | |
| 5,042,114 | A | * 8/1991 | Parrish | F16L 3/233 24/16 PB |
| 5,673,889 | A | * 10/1997 | DeValcourt | B60R 9/08 224/319 |

(Continued)

FOREIGN PATENT DOCUMENTS

| | | |
|---|---|---|
| CN | 101922588 A | 12/2010 |
| CN | 103542178 A | 1/2014 |

(Continued)

OTHER PUBLICATIONS

Merriam-Webster.com, Website: http://web.archive.org/web/20090421153243/http://www.merriam-webster.com/dictionary/radial, Apr. 21, 2009.*

(Continued)

*Primary Examiner* — Amy J. Sterling
(74) *Attorney, Agent, or Firm* — Rebecca L. Henkel; Rickard K. DeMille

(57) ABSTRACT

A mounting device for tubular elements includes a base having a curved surface and a slot for connecting to and being mounted on an existing tubular structural element. The base has a plurality of radially extending fingers forming semi-circular recesses between them. Projections within the recesses having a width less than the width of the mounting device deform a multiplicity of tubular elements such as hydraulic air or water lines to be removably inserted and held within the semi-circular recesses.

17 Claims, 2 Drawing Sheets

(56) References Cited

U.S. PATENT DOCUMENTS

| | | | |
|---|---|---|---|
| 5,730,399 A * | 3/1998 | Baginski | H02G 3/263 24/16 PB |
| 5,988,569 A | 11/1999 | Zhang et al. | |
| 6,109,569 A | 8/2000 | Sakaida | |
| 6,360,051 B1 * | 3/2002 | Daoud | G02B 6/3801 385/134 |
| 6,450,459 B2 | 9/2002 | Nakanishi | |
| 6,523,790 B2 | 2/2003 | Sentpali et al. | |
| 6,641,093 B2 | 11/2003 | Coudrais | |
| 6,752,360 B2 | 6/2004 | Bennett | |
| 6,783,100 B1 | 8/2004 | Cinq-Mars | |
| 6,915,870 B2 | 7/2005 | Sugiyama et al. | |
| 6,932,004 B2 | 8/2005 | Raducha | |
| 7,100,641 B2 * | 9/2006 | Tyrer | F16L 1/123 138/110 |
| 7,172,162 B2 | 2/2007 | Mizukoshi et al. | |
| 7,316,374 B2 | 1/2008 | Maruyama | |
| 7,478,783 B2 | 1/2009 | Royer | |
| 7,485,808 B2 | 2/2009 | Guthke et al. | |
| 7,503,528 B2 * | 3/2009 | Adams | F16B 5/0685 24/297 |
| 7,766,285 B2 | 8/2010 | Cox et al. | |
| 8,020,811 B2 | 9/2011 | Nelson | |
| 8,028,962 B2 * | 10/2011 | Geiger | F16L 3/12 174/656 |
| 8,245,733 B2 | 8/2012 | Renaud | |
| 8,590,847 B2 | 11/2013 | Guthke et al. | |
| 8,668,173 B2 | 3/2014 | Knobloch | |
| 8,733,560 B2 | 5/2014 | McCoy | |
| 8,785,779 B1 | 7/2014 | Jones et al. | |
| 8,894,022 B2 * | 11/2014 | Chirpich | F16L 3/137 248/228.8 |
| D747,276 S * | 1/2016 | Rodrigue | D13/155 |
| 9,241,739 B2 * | 1/2016 | Mueller | A61B 17/704 |
| 9,334,887 B2 * | 5/2016 | Leo, II | F16B 2/22 |
| 2002/0084388 A1 * | 7/2002 | Geiger | F16L 3/237 248/74.3 |
| 2003/0173470 A1 * | 9/2003 | Geiger | F16L 55/035 248/55 |
| 2004/0076465 A1 * | 4/2004 | Geiger | B23K 35/0288 403/278 |
| 2005/0067548 A1 | 3/2005 | Inoue | |
| 2005/0121559 A1 | 6/2005 | King | |
| 2005/0242247 A1 * | 11/2005 | Geiger | F16L 3/2332 248/74.3 |
| 2007/0120023 A1 | 5/2007 | Martinez et al. | |
| 2007/0187555 A1 * | 8/2007 | Rabanin | F16L 3/085 248/49 |
| 2010/0104394 A1 * | 4/2010 | Kwasiborski | H02G 3/32 411/247 |
| 2010/0127135 A1 * | 5/2010 | Stocker | F16L 3/18 248/70 |
| 2010/0186197 A1 * | 7/2010 | Inomata | B60R 16/0215 24/16 R |
| 2010/0258685 A1 | 10/2010 | Gardner et al. | |
| 2011/0024578 A1 | 2/2011 | Spiess et al. | |
| 2011/0147542 A1 * | 6/2011 | Hoek | F16L 3/223 248/68.1 |
| 2012/0292460 A1 | 11/2012 | Hsu | |
| 2012/0312933 A1 | 12/2012 | Casadei | |
| 2013/0140077 A1 | 6/2013 | Yang et al. | |
| 2013/0175407 A1 | 7/2013 | Williams et al. | |
| 2013/0187012 A1 * | 7/2013 | Blakeley | H02G 3/32 248/68.1 |
| 2013/0233597 A1 | 9/2013 | Suiter | |
| 2013/0284878 A1 | 10/2013 | Wellershoff | |
| 2014/0131528 A1 * | 5/2014 | Blakeley | H02G 3/32 248/74.2 |
| 2014/0166825 A1 | 6/2014 | Shiga et al. | |
| 2014/0217244 A1 | 8/2014 | Shiga | |
| 2014/0259620 A1 | 9/2014 | Hicks et al. | |
| 2015/0323101 A1 * | 11/2015 | Hobson | F16L 3/13 248/67.5 |
| 2016/0027553 A1 * | 1/2016 | Murao | H01R 13/73 174/72 A |

FOREIGN PATENT DOCUMENTS

| | | | | |
|---|---|---|---|---|
| DE | 102008052304 A1 * | 5/2009 | | H02G 3/32 |
| DE | 102010054612 A1 * | 6/2012 | | F16L 3/01 |
| EP | 0319410 A1 * | 6/1989 | | F16L 3/22 |
| EP | 1729386 A2 * | 12/2006 | | F16L 3/223 |
| EP | 1 790 894 A1 | 5/2007 | | |
| EP | 2618437 A2 * | 7/2013 | | H02G 3/32 |
| FR | 2575004 A1 * | 6/1986 | | F16L 3/22 |
| FR | 2 978 621 A1 | 7/2011 | | |
| WO | 99/28663 A1 | 6/1999 | | |
| WO | 2004/049531 A1 | 6/2004 | | |
| WO | 2011/159224 A1 | 12/2011 | | |
| WO | 2013/035355 A1 | 3/2013 | | |
| WO | 2013/082843 A1 | 6/2013 | | |
| WO | 2013/134824 A1 | 9/2013 | | |
| WO | WO 2014171274 A1 * | 10/2014 | | H01R 13/73 |

OTHER PUBLICATIONS

Creative Mechanisms, Website: http://web.archive.org/web/20150406023815/http://www.creativemechanisms.com/blog/all-you-need-to-know-about-polypropylene-part-1, Apr. 6, 2015.*

* cited by examiner

MOUNTING DEVICE FOR TUBULAR ELEMENTS

BACKGROUND OF THE INVENTION

1. Field of the Invention

The present invention relates to mounting devices, and, more specifically, to mounting devices for tubular elements.

2. Description of the Related Art

In the industrial, and particularly agricultural field, each agricultural machine has a multiplicity of hydraulic, air, electrical and fluid lines. These lines are routed along frame members in the agricultural machine. The most basic bundle of lines integrated into agricultural machines are the electrical conductors in a wiring harness. Such wiring harnesses extend to the important elements of the device throughout the equipment. As such, the wiring harness for the electrical system has become a spine onto which various hydraulic, fluid and air lines are secured. The lines are typically secured with cable tie or zip tie fasteners wrapped around the wiring harness and the individual lines. Both in production and in service, the various lines are not necessarily mounted at the same time. Consequently, subsequent zip ties are used for each added individual line. In the manufacturing process, the multiplicity of zip ties increases both the component cost and time involved. In terms of maintenance, there is an additional complexity and cost of undoing the zip tie, discarding it and securing the replacement line to the harness. This adds time and component cost to the maintenance procedure.

Accordingly, what is needed in the art is a simple, flexible and effective way to mount tubular elements for ready installation and removal.

SUMMARY OF THE INVENTION

The present invention strives to provide a mounting for a plurality of tubular elements in a flexible manner.

In one form, the invention is a multi-tubular element mounting device having a base with a generally concave recess for conforming to a fixed tubular structure and a plurality of radially extending fingers forming therebetween semi-circular recesses for receiving and holding tubular elements. The device has opposed projections extending from adjacent fingers into the semi-circular recess to releasably hold an element in each one. The base has a slot therethrough for receiving a mounting strap that secures the base to the tubular structure.

In another form, the invention is a frame and a tubular structural element adjacent the frame. A mounting device for the tubular structural element includes a post with flexible ridges for insertion in a hole in the frame to hold a base connected to the post, the base having a slot for receiving a mounting strap. A multi-tubular element mounting device includes a base having a generally concave recess for conforming to the fixed tubular structure on an opposite side to the device for mounting the tubular structure and a plurality of radially extending fingers forming therebetween semi-circular recesses for receiving and folding the tubular element. The multi-tubular element mounting device has opposed projections extending from adjacent fingers into the semi-circular recesses to releasably hold a tubular element therein, the base having a slot therethrough. A mounting strap extends through the slot in the tubular structural element mounting device and the multi-tubular element mounting device for holding the structures together.

One advantage of the present invention is that tubular elements may be inserted and removed without the need to sever and install new mounting straps.

Another advantage is that the orientation of the tubular elements may be fixed and easily identified.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
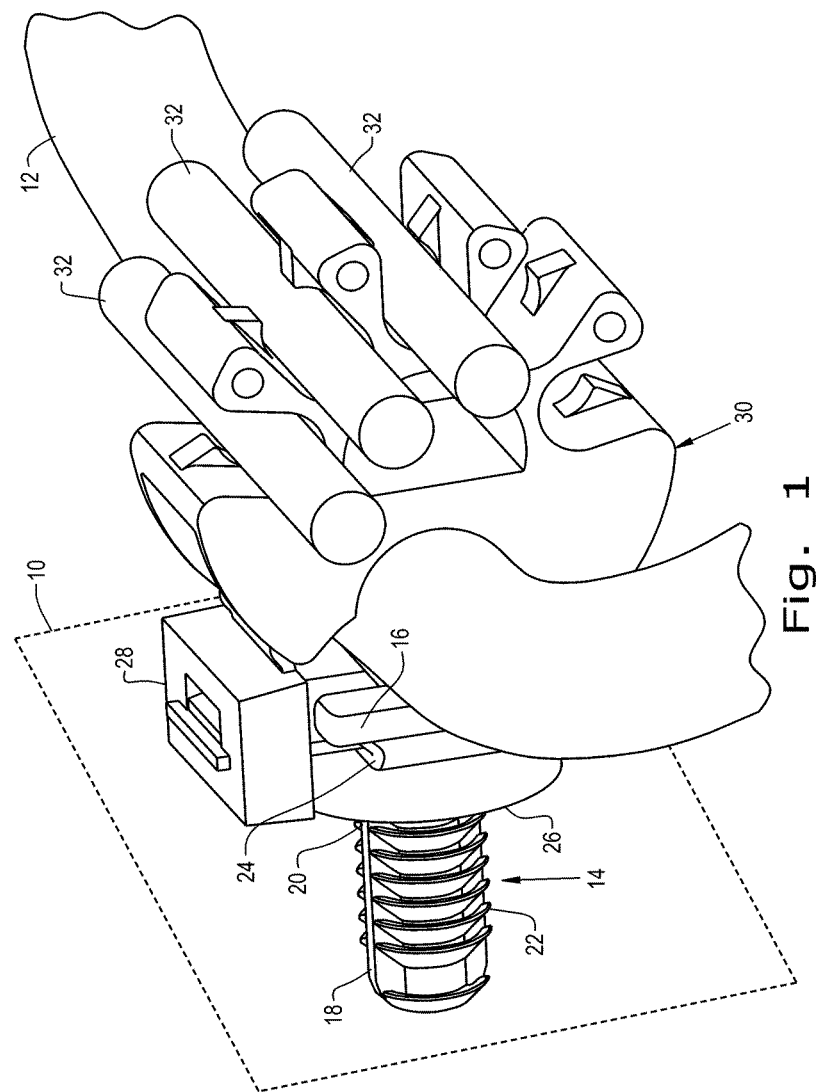
FIG. 1 shows a portion of a frame in an agricultural equipment together with An embodiment of a multi-tubular element mounting device; and, FIG. 2 shows a perspective view of the device of FIG. 1.

Referring now to the drawings, and more particularly to FIG. 1 there is shown an agricultural machine illustrated by a frame 10 shown by dashed lines. As is typical for the agricultural machine 10, a structural tubular element is designed to be permanently incorporated in the machine. This tubular element, designated as 12, typically contains a wiring harness for the various electrical elements commonly found in an agricultural machine. These can be running lights, solenoids, electrical motors, sensors and ECUs, all of which have a relatively permanent location within the machine. The path of the structural tubular element 12 extends past openings 20 (only one of which is shown) positioned on the opposite side of the elements as viewed in FIG. 1. The tubular structural element 12 is mounted to the frame by a mounting device 14. Mounting device 14 includes a base 16 and a post 18 which extends through opening 20. Deformable ridges 22 on post 18 allow insertion of the post into the hole but prevent its removal by opening outward. A conical flange 26 insures that the mounting device 14 is held between the deformable ridges 22 and flange 26 to sandwich the frame 10 in the vicinity of the opening 20. Mounting device 14 has a slot 24 which receives a mounting strap 28 that is typically used to hold the tubular structural element 12 in place. The mounting strap is preferably a cable tie or zip tie device of plastic where a ratcheted extension passes through a slot and allows tightening of the strap.

It is typical in the art to mount other tubular elements such as air, hydraulic or liquid lines to the tubular structural element 12 since it is a relatively permanent structure within the machine 10 and has a convenient tubular form around which mounting straps such as cable or zip ties may be extended. While this does, in fact, mount the other tubular elements in place it does not permit significant flexibility. If any line needs to be moved or replaced, the zip tie and any other zip ties around it need to be severed and removed and new zip ties inserted in the assembly. Not only does this present an issue with initial manufacture of the machine 10 but it is a problem in the servicing, both from the standpoint of additional component cost but more importantly additional labor cost.

Figure 2:
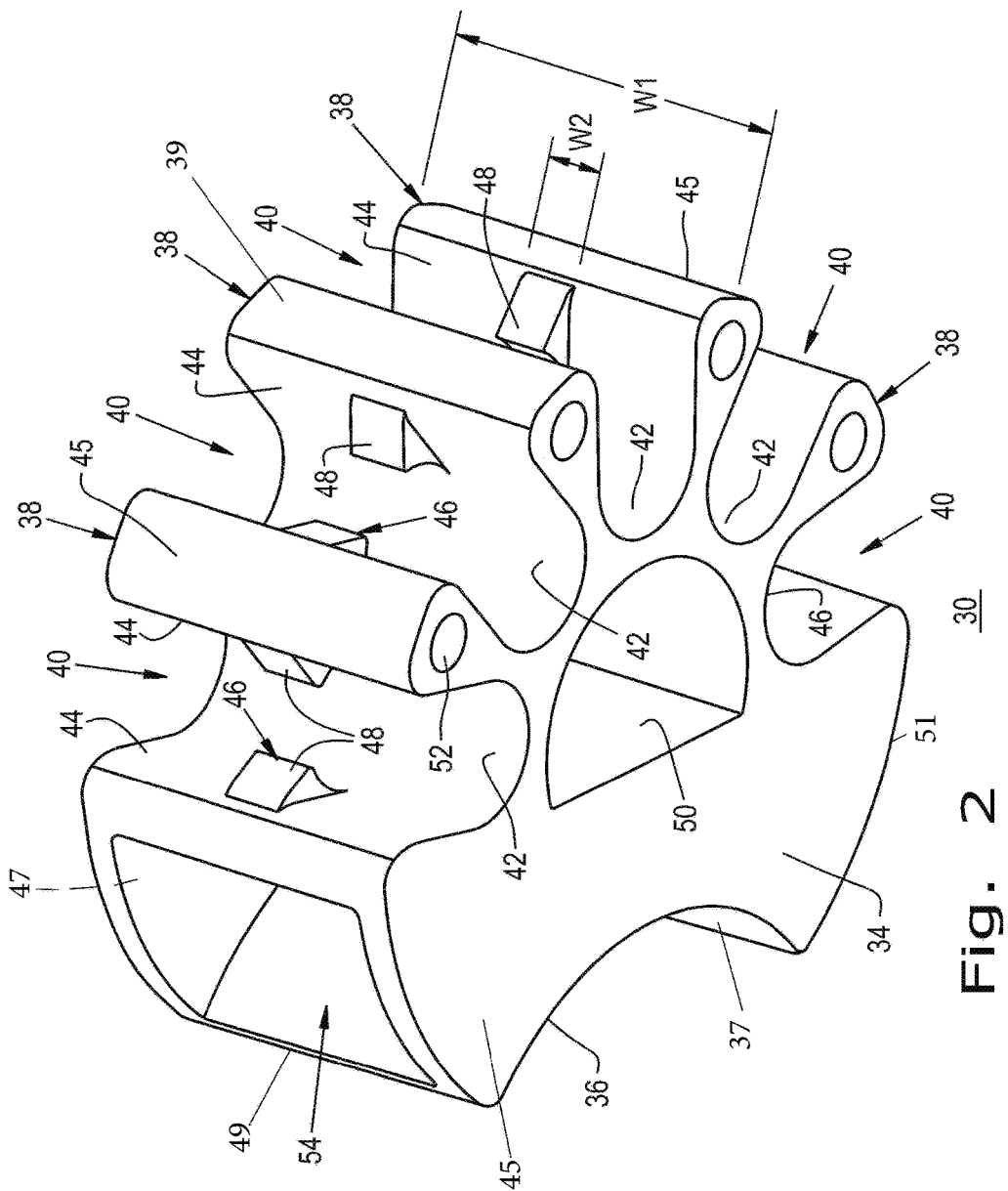

In accordance with the present invention, the multi tube mounting device 30 shown in FIGS. 1 and 2 is employed to correct these deficiencies. Referring to FIGS. 1 and 2, the multi-tube mounting device 30 includes a base 34 for mounting a plurality of tubular elements 32 (see FIG. 1). The base 34 has a concave recess 36 on a first side 37 that conforms to the curved outer structure of the tubular structural element 12. The base 34, as particularly shown in FIG. 2, has a second side 39 opposite the first side 37. The second side 39 of the base 34 has a plurality of radially extending sidewalls 44, at least some of the plurality of radially extending sidewalls 44 forming a plurality of radially extending fingers 38. The plurality of radially extending sidewalls 44 are spaced-apart and parallel relative to each other. Each pair of radially extending sidewalls 44 are configured to form a semi-circular recess 40 therebetween, thereby creating a plurality of curved semi-circular bases 42, each semi-circular curved base 42 connected to the parallel side walls 44 which extend to curved outer ends 45. Projections 46 are formed on the opposed parallel side walls 44 and include ramped surfaces 48 so that the distance between the projections 46 is less than the distance between the parallel side walls 44. The base 34 also includes a pair of opposing and spaced-apart flat sides 45 and 47, respectively (47 shown via phantom lines). A semicircular through hole 50 is formed through flat sides 45 and 47 of the base 34 in the manufacturing process as well as lightening holes 52. In addition, a first end 49 includes a slot 54, conforming to the concave recess 36, which is formed from a first end 49 of the base 34 through an opposite second end 51 of the base 34 to receive a strap. The through hole 50 may also used to route another tubular element (not shown). Preferably, the mounting device 30 is formed from a single piece of plastic and the material is a polypropylene polymer. It should be apparent to those skilled in the art, however that other materials may be utilized with equal success.

As particularly noted in FIG. 2, the width of the mounting device 30 W1 is significant enough to enable the mounting device to be stably mounted on the structural tubular element 12. However, the width W2 of the projections 46 is less and is preferably around 25% of the width W1 of the mounting device 30. The reason for this is that the tubular elements 32 that will be received in the semi-circular recesses 40 have a limited flexibility for deformation to be received within and against the curved bases 42. The tubular elements 32 are typically manufactured to industry standards that include sufficient flexibility in their structure to be deformed. As a result, the tubes 32 may be inserted or removed from the mounting device 30 with relative ease. This has a number of benefits including reduced time for installation during manufacture along with reduced component cost. In addition when lines need to be serviced or replaced they are simply removed and new lines inserted without the need for additional strap material. In addition, the multiple curved recesses 40 allow easy identification of individual lines. The slot 54 in the base 34 of mounting device 30 enables the strap 28 used for the tubular structural element 12 to also be used for the mounting device 30. This ensures a stable position of the mounting device 30 on the tubular structural element 12. It should be noted however, that the mounting device 30 may be deployed and mounted at any point along the length of the tubular structural element 12.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A multi-tubular element mounting device comprising:
 a base including:
 a first side including a concave recess for conforming to a fixed tubular structure;
 a second side opposite the first side and including a plurality of radially extending sidewalls, at least some of the plurality of radially extending sidewalls forming a plurality of fingers, the plurality of radially extending sidewalls spaced-apart and parallel relative to each other, each pair of sidewalls configured to form semi-circular recesses therebetween;
 a pair of opposing and spaced-apart flat sides; and
 a first end and an opposing second end, a slot extending through the first end and the second end and the base surrounding the slot, at least a portion of the perimeter of the slot conforming to the concave recess of the first side of the base, the slot configured to receive a mounting strap therethrough; and
 wherein each sidewall of the plurality of radially extending sidewalls includes a projection having at least one ramped surface configured for holding a tubular element within each semi-circular recess positioned between each pair of sidewalls, and wherein the at least one ramped surface of each projection includes a concave curved ramp oriented toward the semi-circular recess, wherein each projection has a width that is less than a width of each sidewall of the plurality of radially extending sidewalls.

2. The multi-tubular element mounting device as claimed in claim 1, wherein the semi-circular hole is perpendicular to the slot positioned through the first end and the second end of the base.

3. The multi-tubular element mounting device as claimed in claim 1, wherein said slot is configured for a cable tie or a zip tie strap fastener.

4. The multi-tubular element mounting device as claimed in claim 2, wherein the semi-circular hole and the slot do not intersect each other.

5. The multi-tubular element mounting device as claimed in claim 1, wherein the width of each of said projections is less than 25% of the width of each sidewall of the plurality of radially extending sidewalls.

6. The multi-tubular element mounting device as claimed in claim 1, wherein the plurality of radially extending fingers have curved outer ends.

7. The multi-tubular element mounting device as claimed in claim 1, wherein said multi-tubular element mounting device is formed from a single piece of material.

8. The multi-tubular element mounting device as claimed in claim 7, wherein said base is formed from polypropylene polymer.

9. An agricultural machine comprising:
 a frame;
 a tubular structural element extending along the frame, the frame having holes at given locations along the path of the tubular structural element;

a mounting device for the tubular structural element comprising a base and a post extending from the base, the post having a plurality of longitunally spaced deformable ridges for receiving and holding the base, the base having a slot therethrough; and, a multi-tubular element mounting device comprising a base including:
- a first side including a concave recess for conforming to a fixed tubular structure;
- a second side opposite the first side and including a plurality of radially extending sidewalls, at least some of the plurality of radially extending sidewalls forming a plurality of fingers, the plurality of radially extending sidewalls spaced-apart and parallel relative to each other, each pair of sidewalls configured to form semi-circular recesses therebetween;
- a pair of opposing and spaced-apart flat sides; and
- a first end and an opposing second end, a slot extending through the first end and the second end and the base surrounding the slot, at least a portion of the perimeter of the slot conforming to the concave recess of the first side of the base, the slot configured to receive a mounting strap therethrough;
- wherein each sidewall of the plurality of radially extending sidewalls includes a projection having at least one ramped surface configured for holding a tubular element within each semi-circular recess positioned between each pair of sidewalls, wherein the at least one ramped surface of each projection includes a concave curved ramp oriented toward the semi-circular recess, wherein each projection has a width that is less than a width of each sidewall of the plurality of radially extending sidewalls, and
- wherein the first side and the second side of the base are asymmetrical relative to each other;

a mounting strap extending through the slot in the mounting device of the tubular structural element and through the slot in the said multi-tubular element mounting device for holding the multi-tubular element mounting device to the tubular structural element and the frame, wherein the base of the mounting device is spaced from the frame by a user selected distance dependent upon a user selected number of the plurality of deformable ridges being received in a corresponding hole in the frame.

10. The agricultural machine as claimed in claim 9, wherein a semi-circular hole is formed through the flat sides of the base and is perpendicular to the slot extending from the first end through the second end.

11. The agricultural machine as claimed in claim 9, wherein said mounting strap is one of a cable tie and a zip tie strap fastener.

12. The agricultural machine as claimed in claim 10, wherein the semi-circular hole and the slot do not intersect each other.

13. The agricultural machine as claimed in claim 9, wherein the width of each of said projections is less than 25% of the width of each sidewall of the plurality of radially extending sidewalls.

14. The agricultural machine as claimed in claim 9, wherein the radially extending fingers have curved outer ends.

15. The agricultural machine as claimed in claim 9, wherein said multi-tubular element mounting device is formed from a single piece of material.

16. The agricultural machine as claimed in claim 15, wherein said multi-tubular element mounting device is formed from polypropylene polymer.

17. The agricultural machine as claimed in claim 9 further comprising a plurality of tubular elements received in the semi-circular recesses of said multi-tubular element mounting device.

\* \* \* \* \*